Aug. 29, 1961      H. W. MOORE      2,998,207
WIRE TENSIONING DEVICE
Filed Feb. 16, 1959
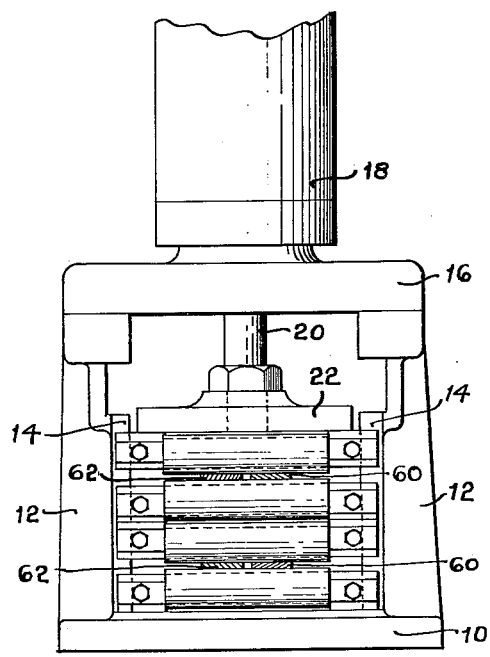
FIG. 1
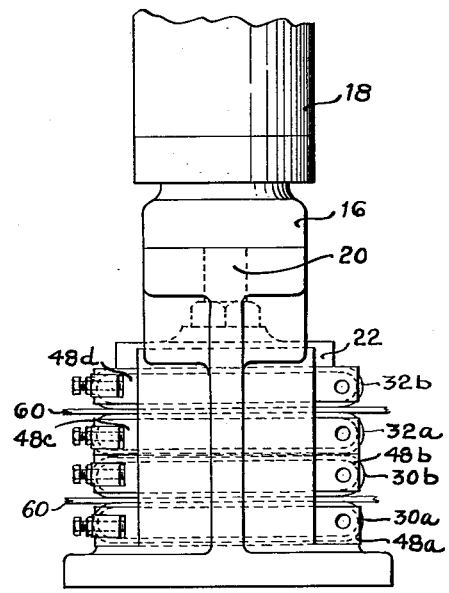
FIG. 2
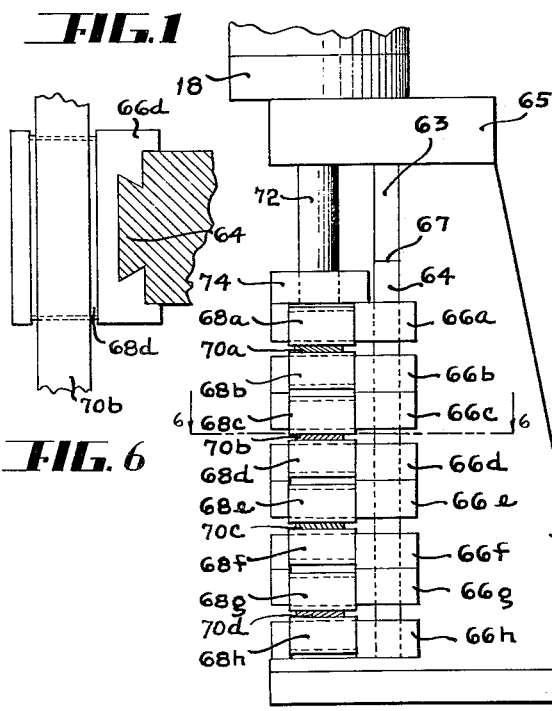
FIG. 6
FIG. 3
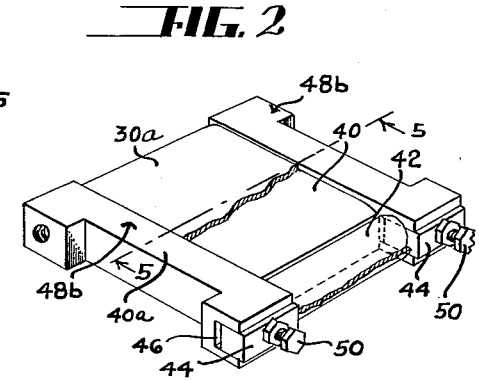
FIG. 4
FIG. 5
INVENTOR.
Harry W. Moore
BY
HIS ATTORNEYS

2,998,207
WIRE TENSIONING DEVICE
Harry W. Moore, 5051 Kittridge Road, Dayton 24, Ohio
Filed Feb. 16, 1959, Ser. No. 793,493
11 Claims. (Cl. 242—149)

This invention relates to material tensioning means and more particularly to wire tensioning means exerting a pressure against the wire without distorting the wire or wires and insulation fed with the wire and without injury to the wire and the insulation, but not necessarily so limited.

In the past, several types of tensioning devices have been used in tensioning various types of materials, such as wire, yarn, rope, webs, et cetera, wherein the material is tensoned by passing the material through nips of tensioning rollers or past stationary friction members or through a tortuous path.

A problem arises when tensoning insulated wires in conventional tensioning devices, in that the insulation and wires may be damaged or distorted.

It is an object of this invention to provide a tensioning device, wherein sufficient grip is made on the material to properly tension the same without exerting a pressure on the material that is injurious thereto. This has been accomplished by passing the material to be tenisoned between a pair of belts driven by the material, the belts being backed by friction surfaces throughout a sufficient length to properly tension the material without exerting a pressure that is injurious to the material. The friction between the belts and the backing friction surface is sufficient to create the desired tension in the material, the belts engaging the material throughout a sufficient area to prevent any appreciable slippage between the belts and the material, so that the belts are driven by the material being tensioned.

Another object of this invention is to provide adjusting mechanism for adjusting the friction between the belts and the backing friction surfaces.

Another object is to provide a plurality of pairs of co-belts for tensioning a plurality of individual strips or bales of material to be tensioned, one common adjusting mechanism being used to adjust the friction between the belts and their respective backing members.

Another object of this invention is to provide a plurality of pairs of material tensioning belts that are supported only from one side, so that the materials to be tensioned may be removed laterally from the unsupported sides of the belts to permit the materials to be transposed without severing the several materials.

Other objects and advantages reside in the construction of parts, the combination thereof, the method of manufacture and the mode of operation, as will become more apparent from the following description.

In the drawings, FIGURE 1 is a front elevational view of a tensioning device.

FIGURE 2 is a side elevational view.

FIGURE 3 discloses a modification wherein the tensioning mechanism is supported from one side of the standard.

FIGURE 4 is a perspective view of one of the tensioning members shown in FIGURES 1 and 2.

FIGURE 5 is a cross sectional view, taken substantially on the line 5—5 of FIGURE 4.

FIGURE 6 is an enlarged, fragentary, cross sectional view, taken substantially on the line 6—6 of FIGURE 3.

The device disclosed herein includes a base 10 and a pair of oppositely disposed standards 12, each provided with a pair of rabbets 14. The standards 12 are held together at the top by means of a cross member 16 supporting a tensioning device 18 biasing a rod or plunger 20 having fixedly attached thereto a plate member 22. A helical spring, not shown, may be mounted in member 18. Suitable mechanism may be used to adjust the biasing force applied downwardly on the rod or plunger 20.

The tensioning device per se includes a plurality of pairs of belts 30a, 30b, 32a and 32b. Each of the belts extends over a backing plate or member 40 having a smooth, flat, friction surface. This flat friction surface is preferably highly polished, so as to provide a smooth back-up surface for the belts. The member 40 has one end curved, as clearly shown on the right hand side of FIGURE 2. The belt passes over this curved end of member 40. The opposite end of the belt may extend over a roller 42 journalled in journal blocks 44 adjustably mounted in slots 46 in the end frame members 48. The friction plate member 40 is also mounted between the end frame members 48. Adjusting screws 50 are used in tensioning the belt by adjusting the roller 42. There are four units like those disclosed in FIGURE 4 in the assembly disclosed in FIGURES 1 and 2. The number of units arranged in pairs may be used as needed.

As clearly shown in FIGURES 1 and 2, the frame members 48a and 48b are separated from each other, in that the belts are located beyond the frame members 48a and 48b on the sides adjacent the other frame member.

As clearly seen in FIGURE 5, the belt 30a, extending along the top of member 40, is located below the top of the side frame portions 40a, so that the belt carried by frame member 48b does not come in conflict with and is not influenced by the movement of the belt 32a.

As clearly seen in FIGURE 4, the belt in contact with the material to be fed, that is, the belt portion underlying the backing member 40, projects beyond the frame 48b, as clearly shown in FIGURE 5, so that the frames of the belts do not interfere with the belts engaging the material to be tensioned. The contacting frames of adjacent pairs of belts are juxtaposed so that the frames rest on each other. The tensoning mechanism is applied with substantially equal force to each pair of co-operating belts. As clearly seen in FIGURE 5, member 40 is undercut in the upper portion of this figure, to provide a channel for the belt on the upper side of the frame.

The wires 60 and 62, which may really consist of bundles or bales of wires enclosed in insulation material or they may be cables of various shapes, are clamped between adjacent pairs of belts 30a, 30b, 32a and 32b respectively. As the wires 60 and 62 are pulled through this tensioning device between the belts, the belts are driven by the wires. The friction between the belts and the friction surface of members 40 provides the tension that is applied to the wires 60 and 62. Due to the length of the belts, the belts frictionally grip the wires through a long area, thereby requiring very little pressure.

The pull on the wires drives the belts without any appreciable slippage, if any slippage, of the wires. The slippage takes place between the belts and the friction surface of members 40. The friction may be adjusted by adjusting the tensioning mechanism, including the tensioning device 18 which controls the pressure upon the rod 20. Furthermore, the tension may be adjusted by tightening or loosening the screws 50, to thereby adjust the tension of the belts per se.

For some purposes it may be desirable to transpose the wires, that is, to change the position of the wires with respect to the other wires of this series being fed through the tensioning device. In the modification disclosed in FIGURE 3, a device has been produced whereby the wires may be transposed without severing the wires or unthreading the wires from the tensioning device. In this embodiment a standard 160 mounted upon a bed 61 is provided with a dovetail projection or extension extending from near the top to the bed. A portion 63 between the capping member 65 and the upper end 67 of the dovetail portion 64 provides a place for removing and reinserting the belt supporting members 66a to 66h. These belt supporting members are stacked one on top of each other, with the exposed portion of the belt at one side facing the exposed portion of the adjacent member on the other side. There is a belt 68a to 68h for each of members 66a to 66h respectively. The wires 70 are positioned between adjacent pairs of belts, as clearly shown in FIGURE 3. In this particular embodiment there are four pairs of belts and four wires are tensioned.

The tension of the wires may be adjusted by the tensioning device 18 in a manner identical to that disclosed in connection with the preferred embodiment. This tensioning device 18 drives a plunger 72 provided with a plate member 74 extending over the frames of the belt supporting members 66a to 66h. Having found it desirable to transpose, for example, the two upper wires, the wires 70a and 70b may be removed sideways to the left, as viewed in FIGURE 3, the wires 70b being replaced between the upper belts and the wires 70a between the second pair of belts, merely interchanging positions. Likewise, the other wires 70c and 70d may be transposed and interchanged, as far as position is concerned, with any of the other wires.

Instead of tensioning wires, the belt tensioning device may be used for tensioning yarn, strips of material such as cloth, paper, insulating material, strands of rope, and any other kind of material that requires tensioning.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A tensioning device for tensioning a plurality of strips of material pulled therethrough, said tensioning device including a plurality of pairs of belts, a plurality of pairs of belt supporting members extending parallel to each other, each supporting member having a channel on one side through which the belt passes, the belt projecting beyond the belt supporting member on the other side, the channels of the belt supporting members of adjacent pairs of belt supporting members being juxtaposed upon each other, and adjustable means for biasing the belts of each pair toward each other to thereby adjust the pressure exerted upon the material pulled between each pair of belts driven thereby.

2. A tensioning device for tensioning a plurality of strips pulled therethrough according to claim 1, wherein the adjustable means biasing each pair toward each other exerts a biasing force to all of the pairs simultaneously.

3. A tensioning device for tensioning a plurality of strips of material pulled therethrough, said tensioning device including a plurality of pairs of belts, a plurality of pairs of belt supporting members extending parallel to each other, each supporting member having a channel on one side through which the belt passes, the belt projecting beyond the belt supporting member on the other side, the channels of the belt supporting members of adjacent pairs of belt supporting members being juxtaposed upon each other, a vertically disposed standard, said standard being connected to one side of each of the belt supporting members by a dovetail tongue and groove arrangement, the other side of the belt supporting members being unsupported so as to permit removal and insertion of the strip material from the unsupported side of the belt supporting members.

4. A tensioning device for tensioning a plurality of strips pulled therethrough according to claim 3, wherein an adjustable tensioning mechanism is used in adjusting the pressure between the belts of each pair to thereby regulate the tension of the belts.

5. A tensioning device for tensioning a plurality of strips pulled therethrough according to claim 3, wherein the belt supporting members are adjustably biased against each other to thereby adjust the tension of the belts.

6. A tensioning device for tensioning material pulled through the same, said tensioning device including a pair of belts, a pair of belt supporting members, each of said members having a pair of belt engaging back-up surfaces, said belts surrounding the supporting members and contacting opposite sides thereof, at least one side of each of the belt supporting members being flat and highly polished and lying in a plane parallel to the like belt engaging surface of the other member, the material to be tensioned being positioned between the portion of the belts engaging the flat polished belt engaging surfaces, the material upon being pulled through the tensioning device driving the belts, the friction between the belts and the highly polished surfaces tensioning the material, means for adjusting the friction between the belts and the back-up friction surfaces, and guide means for guiding the supporting members in a path normal to the belt engaging surfaces for holding the supporting members aligned.

7. A tensioning device according to claim 6, wherein each of said supporting members includes an elongate portion having the pair of belt engaging surfaces, each of said supporting members having frame portions on opposite edges thereof, the frame portions cooperating with the elongate portion to form a channel for the belt on one side of each of the supporting members, and adjustable means for biasing the belt supporting members toward each other.

8. A tensioning device according to claim 6, wherein the guide means includes a pair of vertically disposed standards interlocked with the belt supporting members to hold the belt supporting members aligned.

9. A tensioning device according to claim 6, wherein the guide means includes a standard, said standard being connected to one side of each of the supporting members, the other side of the belt supporting members being unsupported so as to permit removal and insertion of continuous length material from the unsupported side of the belt supporting members.

10. A tensioning device according to claim 6, wherein the guide means includes a standard connected to one edge of the supporting members by a dovetail tongue and groove arrangement, the other edge of the belt supporting members being unsupported so as to permit removal and insertion of the strip material from the unsupported edge of the belt supporting members.

11. A tensioning device according to claim 6, wherein the means for adjusting the friction between the belts and the back-up friction surface includes mechanism for changing the pressure applied transversely to the belts.

References Cited in the file of this patent

UNITED STATES PATENTS

| 1,939,796 | Spowart | Dec. 19, 1933 |
| 2,774,593 | Lewis et al. | Dec. 18, 1956 |

FOREIGN PATENTS

| 724,708 | Germany | Oct. 16, 1943 |